Figure 1:
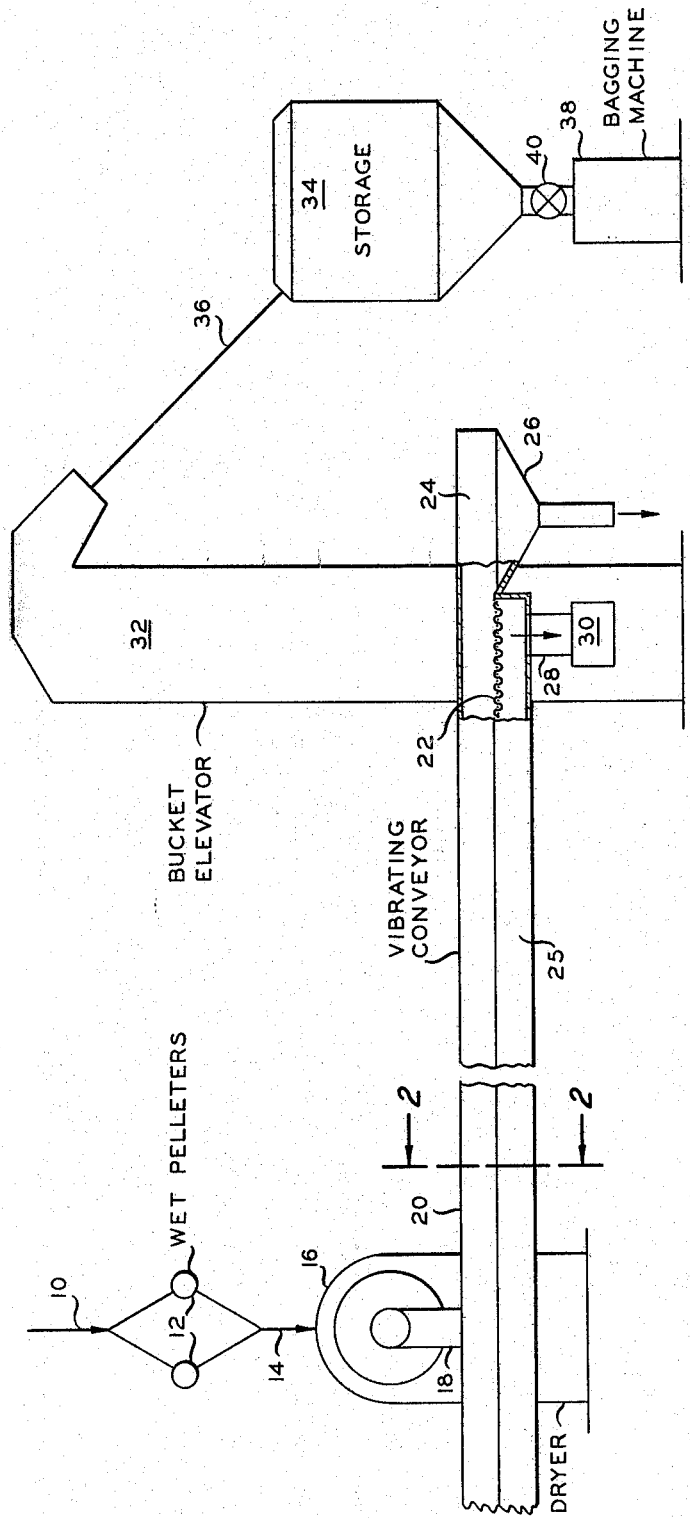

INVENTOR.
L. C. KEATON
BY Young & Quigg
ATTORNEYS

United States Patent Office 3,290,791
Patented Dec. 13, 1966

3,290,791
PROCESS AND APPARATUS FOR IMPROVING
QUALITY OF CARBON BLACK PELLETS
Lawrence C. Keaton, Borger, Tex., assignor to Phillips
Petroleum Company, a corporation of Delaware
Filed Dec. 13, 1963, Ser. No. 330,376
5 Claims. (Cl. 34—13)

This invention relates to a process and apparatus for improving the Photelometer of wet pelleted carbon black.

In the wet pelleting of carbon black the effluent pellets from the pelleter contain water in the range of about 40 to 60 weight percent of the pellets, and usually about 50 percent water. These pellets are fed to a dryer which reduces the water content of the pellets below about one weight percent. One type of dryer commonly used is a rotary drum dryer surrounded by a gas-fire furnace chamber whereby the drum is heated externally and some of the hot combustion gas is also passed through the interior of the drum. Other types of dryers such as fluid bed dryers may also be used for the drying operation.

It has been found that the maximum drying temperature, usually the outlet temperature from the dryer, effects a change in the rubber properties (cure rate) and Photelometer of the product pellets. Photelometer is a measure of the benzene extraction discoloration or the chloroform extraction discoloration. The maximum pellet temperature in the dryer is limited by the safe maximum storage temperature of the product pellets. If the pellets passed to storage are above a fixed safe storage temperature, spontaneous combustion even as late as a month or so after storage may occur. This safe storage temperature is substantially below a desirable drying temperature which effects a Photelometer above about 85 by benzene extraction.

This invention is concerned with a solution to the problem of increasing Photelometer of dried carbon black pellets without risking unduly high pellet storage temperature which is prone to cause spontaneous combustion in storage.

Accordingly the principal object of the invention is to provide an improved process and apparatus for increasing the Photelometer and improving the rubber properties of wet pelleted carbon black. Another object is to provide a process and apparatus which simultaneously classifies, cools and transports dried pellets from a dryer to storage facilities. Other objects of the invention will become apparent upon consideration of the accompanying disclosure.

A broad aspect of the invention comprises passing dried pellets of carbon black from a dryer to a cooling type conveyor for transport to storage which substantially cools the hot dry pellets during transport so as to allow the use of a higher drying temperature and thereby increase the Photelometer and improve the rubber properties of the product pellets. The hot dry pellets are preferably transported from the outlet of the dryer to storage facilities through an elongated horizontal vibratory conveyor which is provided with a horizontal screen extending the length of the conveyor so that the oversize pellets are separated from the product size pellets during the transport and cooling and the oversize pellets and product pellets are delivered through separate outlets at the delivery end of the conveyor.

An acceptable safe storage temperature is about 300° F. Higher storage temperatures might be used in some instances because the spontaneous combustion temperature of the pellets depends upon a number of factors which are not always controllable. No instance is known of pellets in storage igniting spontaneously when the pellets are stored at a temperature not in excess of 300° F.

By utilizing a vibratory conveyor with a screen therein of substantial length such as at least 20′, a temperature drop in the range of 100° to 300° F. is readily obtained in the conveyor, thereby permitting a substantial and beneficial increase in temperature in the dryer which naturally increases the Photelometer and improves the rubber characteristics of the product pellets. Normally, a vibratory conveyor does not utilize a screen; however, when a screen was installed in the conveyor for the purpose of separating the oversize pellets from product size pellets, it was discovered that the screening action aerates the black and conducts heat from the pellets so as to provide a surprising cooling effect upon the transported pellets. This unexpected temperature drop of the pellets in passing through the conveyor permits operating the dryer at high enough temperatures to effectively control the final product properties such as cure rate and Photelometer. It is feasible to operate the dryer so that the exit pellet temperature is in the range of 500° to 600° F. and cool the pellets in the conveyor to substantially below 300° F. and even below 200° F. when utilizing a conveyor 30′ in length between the dryer outlet and the elevator leading to storage.

Figure 2:
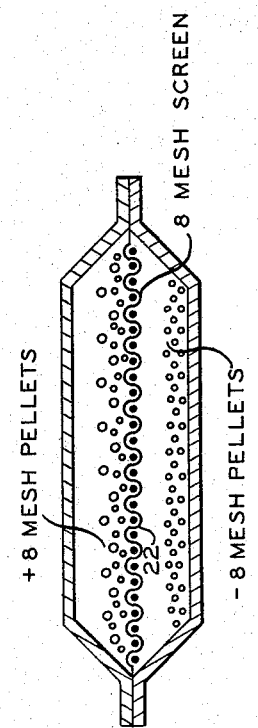

A more complete understanding of the invention may be had by reference to the schematic drawing of which FIGURE 1 is an elevation showing a specific embodiment of the invention, and FIGURE 2 is a transverse cross section taken on the line 2—2 of FIGURE 1.

Referring to the drawing a stream of carbon black is fed through line 10 to a pair of wet pelleters 12 where the black is mixed with water in the proportions of about 50/50 by weight and the wet pellets formed therein are passed through line 14 into rotary drum dryer 16. Effluent dry pellets pass through chute 18 into vibratory conveyor 20 which is provided with a wire mesh screen 22 (shown in FIGURE 2). Screen 22 may be of any suitable mesh size, depending upon the maximum product size pellets desired. In some applications the 10 mesh screen has been utilized while in others the screen has been of 8 mesh size so that product pellets are those smaller than 8 mesh size or 10 mesh size, depending upon which screen is utilized. Conveyor 20 is a conventional vibratory conveyor in which screen 22 has been installed and the downstream end of the conveyor has been modified as illustrated in FIGURE 1 so that the upper section 24 of the conveyor extends beyond the bottom of the conveyor and delivers oversize pellets into reservoir 26. The screen 22 in the conveyor terminates at the downstream end of the bottom section 25 so that oversize pellets are fed off the end of the screen into receiver 26 from which they flow to suitable disposal such as recycling to the wet pelleters for repelleting.

Pellets of 8 or 10 mesh and finer, depending upon the screen size used, pass through a discharge opening in the downstream end of the bottoms section 25 through a chute 28 and reservoir 30 into a bucket elevator 32 which elevates the product pellets to a level above storage tank or bin 34 to which they flow through chute 36. Pellets from bin 34 are fed to bagging machine 38 by operation of star valve or other suitable feeder 40.

In a specific embodiment of the invention in actual plant use producing about 60,000 lbs. of pellets per day per dryer, three dryers of the type of dryer 16 in FIGURE 1 spaced 16′ apart along vibratory conveyor 20 were each fed by a pair of wet pelleters 12 from a common surge vessel (not shown). The section of conveyors between dryer 16 and elevator 32 was 30′ long, i.e., the distance from downcomer 18 to chute 28 was 30′. Conveyor 30 was 18″ wide at the screen level and an 8 mesh screen extended completely across the conveyor. This screen was stainless steel and the top and bottom of the conveyor were also fabricated from this material. The dryers were regulated to maintain an outlet pellet temperature of about 550° F. and the product pellets were at a temperature in the range of 250° to 300° F. when passed to storage. About 10 percent of the pellets passing through the conveyor were oversize and recovered through receiver 26. The Photelometer of the product pellets was in the range of 88 to 90 by benzene extraction.

Certain modifications of the invention will become apparent to those skilled in the art and the illustrative details disclosed are not to be construed as imposing unnecessary limitations on the invention.

I claim:
1. A process comprising the steps of
   (1) feeding wet carbon black pellets of sizes ranging from substantially finer than 8 mesh to substantially coarser than 8 mesh to a rotary dryer;
   (2) heating said pellets in said dryer to a temperature in the range of 500° to 600° F. so as to substantially increase the Photelometer thereof;
   (3) passing dried pellets from said dryer directly to a separate transport and cooling zone leading to a storage zone and cooling said pellets to a temperature not in excess of 300° F. therein to permit safe storage when said pellets reach the end of said transport zone;
   (4) and storing the pellets from step (3).
2. A process comprising the steps of
   (1) feeding wet carbon black pellets of sizes ranging from substantially finer than 8 mesh to substantially coarser than 8 mesh to a rotary dryer;
   (2) heating said pellets in said dryer to a temperature at least 200° F. above a safe storage ignition temperature of about 300° F.;
   (3) passing dried pellets from said dryer directly to an elongated horizontal vibratory conveyor leading to a storage zone, said conveyor being provided with a horizontal wire screen extending substantially the length thereof intermediate its top and bottom, and cooling said pellets to a temperature not in excess of 300° F. therein to permit safe storage when said pellets reach said storage, product pellets passing thru said screen to the bottom of said conveyor and the oversize pellets passing off the downstream end of said screen;
   (4) and storing the pellets from step (3).

3. In a process for drying wet carbon black pellets of a substantial range of sizes, the major portion being less than 8 to 10 mesh size, in a drying zone wherein the normal maximum drying temperature is limited by the storage ignition temperature of the effluent dry pellets and Photelometer of the product pellets is affected by and limited by maximum pellet drying temperature, the improvement comprising passing effluent pellets directly to a horizontal vibrating conveyor containing a horizontal screen of 8 to 10 mesh size and leading to a storage zone; simultaneously cooling and screening said pellets to recover a substantial proportion of oversize pellets larger than 8 to 10 mesh off the downstream end of said screen and pellets smaller than said mesh size falling thru said screen from the downstream end of the bottom of said conveyor and cool said pellets in said conveyor at least 100° F.; and heating said pellets in said dryer to a temperature at least 100° F. higher than said normal maximum drying temperature so as to produce pellets of higher Photelometer than normally produced.

4. The process of claim 3 wherein said carbon black is a furnace black, said normal maximum drying temperature is about 450° F., said pellets are heated to a temperature in the range of 550° to 600° F. in the drying zone, and the cooled temperature of said pellets as passed to storage is not in excess of about 300° F.

5. Apparatus comprising in combination:
   (1) a wet pelleter,
   (2) a rotary drum dryer connected to receive wet pellets from the pelleter of (1),
   (3) a cooling conveyor connected to receive and cool hot pellets from the dryer of (2),
   (4) a storage means connected to receive cooled pellets from the conveyor of (3), and
   (5) and 8 to 10 size wire screen in said conveyor for classifying said pellets during transport thereof.

References Cited by the Examiner
UNITED STATES PATENTS

| | | | |
|---|---|---|---|
| 2,163,556 | 6/1939 | Glaze | 34—164 |
| 2,900,737 | 8/1959 | Heller | 34—12 |
| 3,112,186 | 11/1963 | Davis et al. | 34—164 X |

FREDERICK L. MATTESON, JR., *Primary Examiner.*

A. D. HERRMANN, *Assistant Examiner.*